United States Patent

[11] 3,543,897

[72] Inventors James H. Lemke
 Sturtevant;
 Raymond A. Bazen, South Milwaukee, Wisconsin
[21] Appl. No. 807,847
[22] Filed March 17, 1969
[45] Patented Dec. 1, 1970
[73] Assignee J. I. Case Company
 a corporation of Wisconsin

[54] SYNCHRONIZER ACTIVATOR
 9 Claims, 4 Drawing Figs.
[52] U.S. Cl. ................................................ 192/53,
 74/339
[51] Int. Cl. ................................................ F16h 3/38,
 F16d 23/04
[50] Field of Search ........................................... 74/339;
 192/53

[56] References Cited
 UNITED STATES PATENTS

| | | | |
|---|---|---|---|
| 952,535 | 3/1910 | Loomis | 192/53 |
| 1,803,535 | 5/1931 | Murray | 74/339 |
| 2,930,462 | 3/1960 | Willis | 192/53 |
| 3,048,247 | 8/1962 | Cook et al. | 192/53 |
| 3,063,529 | 11/1962 | Cook | 192/53 |
| 3,078,975 | 2/1963 | Eaton | 192/53 |
| 3,161,270 | 12/1964 | Aschauer | 192/53 |
| 3,374,870 | 3/1968 | Johnston, Jr. | 192/53 |

Primary Examiner—Arthur T. McKeon
Attorney—Dressler, Goldsmith, Clement and Gordon ABSTRACT: A synchronizing mechanism for a transmission including a rotatable shaft, a first gear coaxial with the shaft and free to rotate relative thereto, and a second gear coaxial with the shaft and fixed to rotate therewith. The synchronizing mechanism initially rotates the first gear at the rotational speed of the second gear, and subsequently establishes a direct driving connection between the gears. The synchronizing mechanism includes a shifting mechanism comprised of an axially movable coupling member and an actuating member that is movable both axially and relative to the coupling member. The actuating member is directly coupled to the second gear, and cooperating cam and cam follower means are provided on the actuating member and coupling member, so that when the actuating member is moved from a rest position to an intermediate position, clutch means associated with the coupling member and first gear are brought into engagement to rotate the first gear at the speed of the shaft. Cooperating means are provided on the first gear and the actuating member, so that upon movement of the actuating member from the intermediate position to an engaged position, a direct driving connection is established between the actuating member and the first gear.

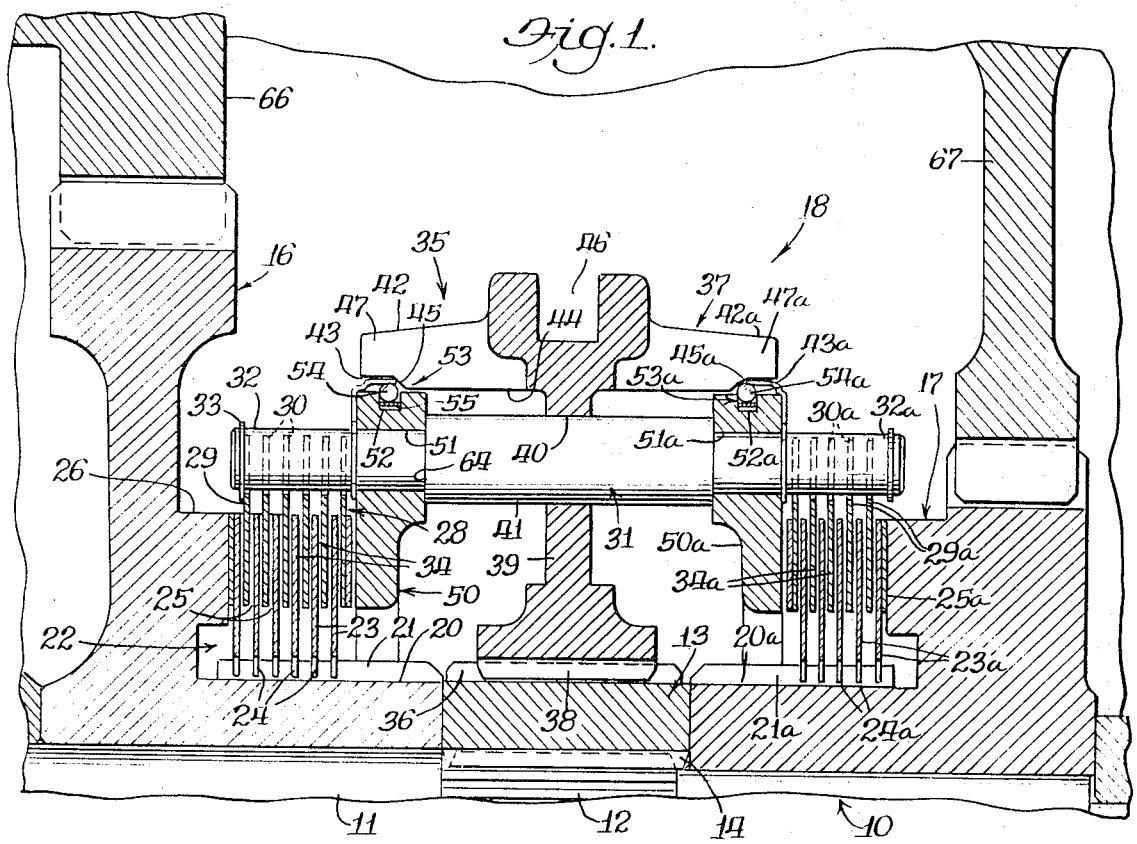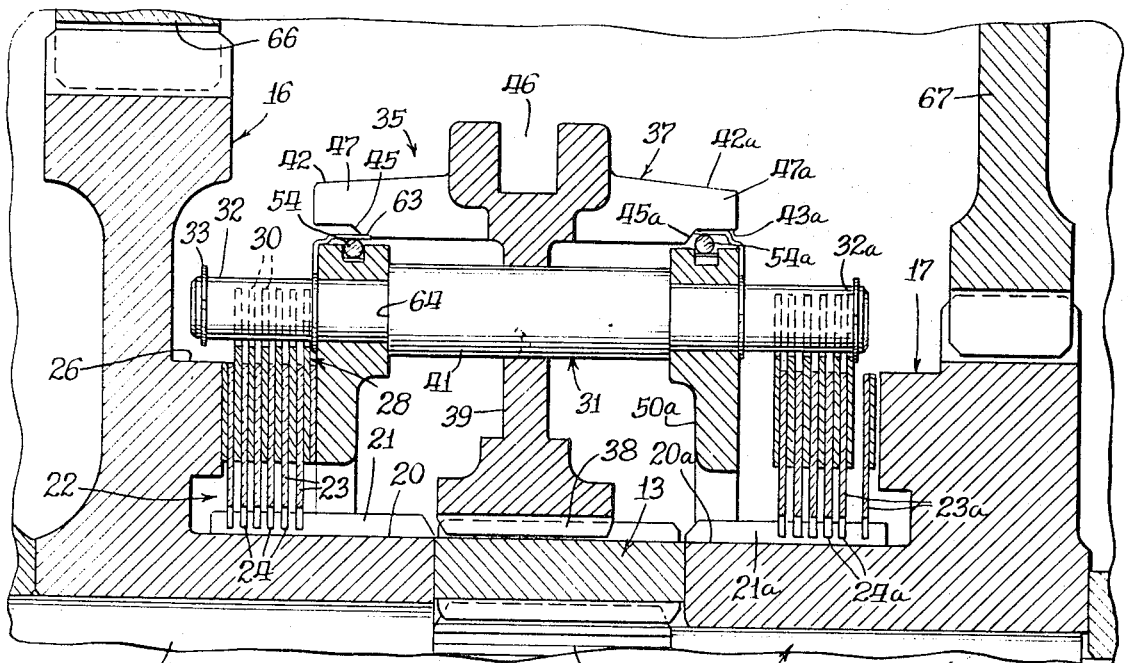

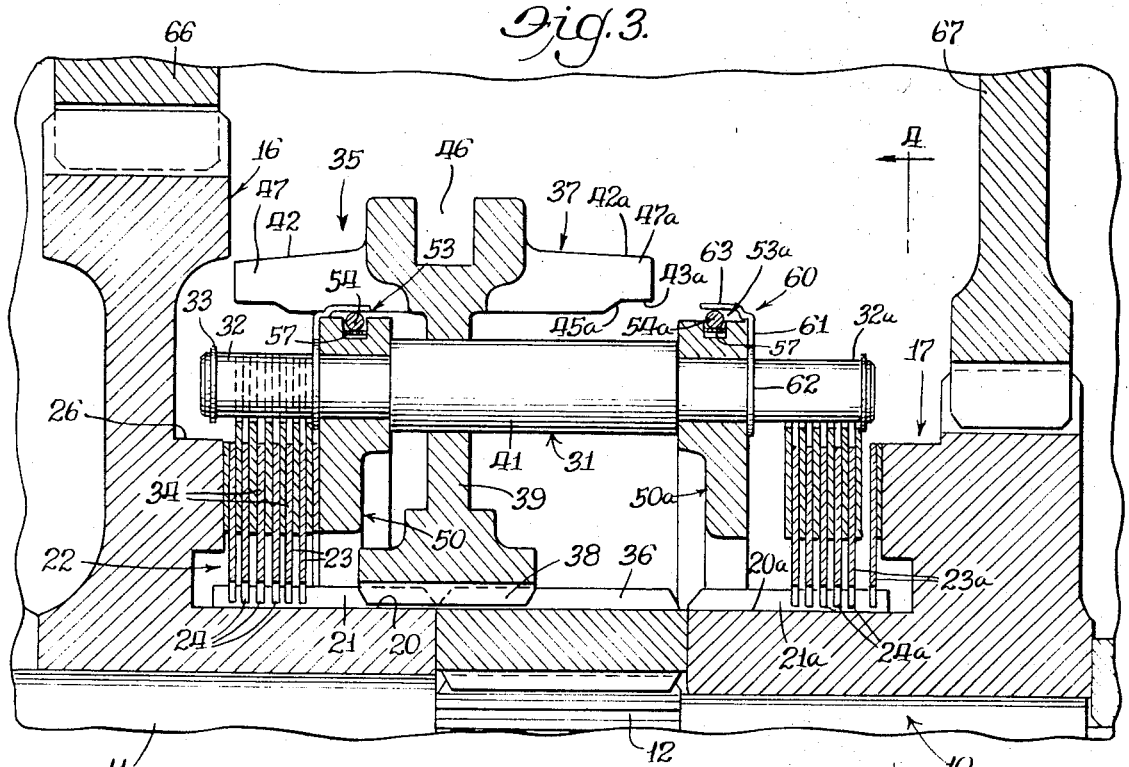
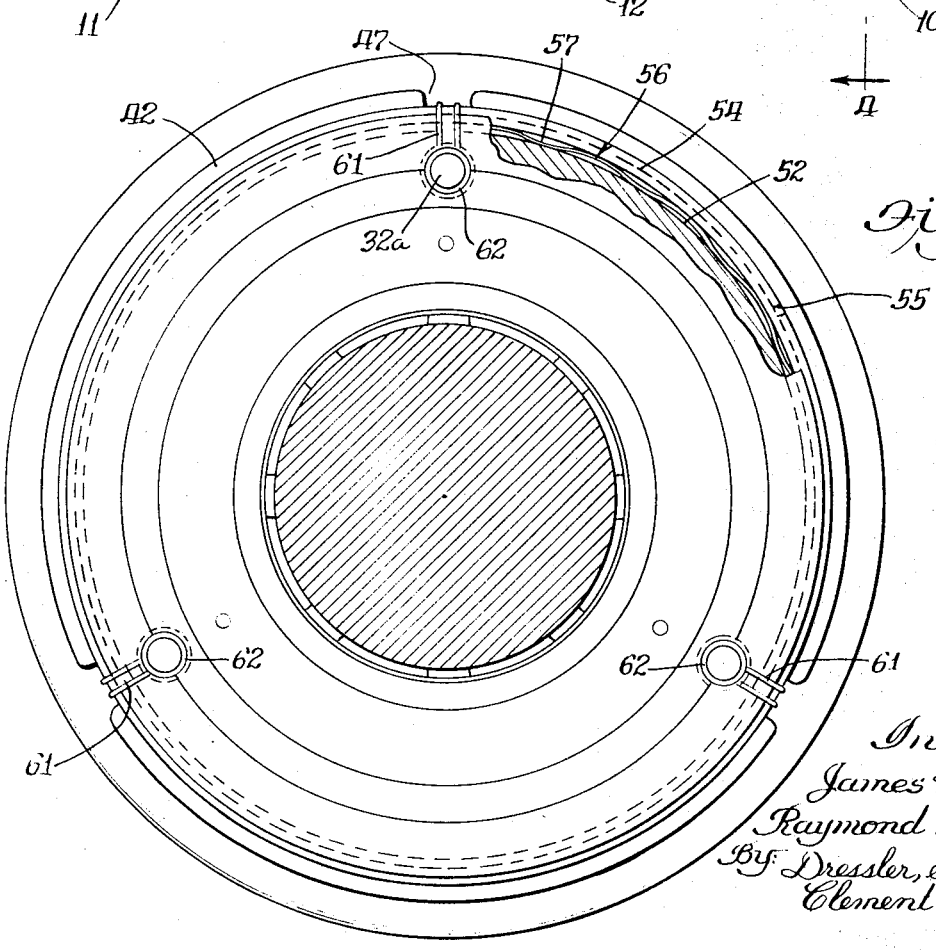

SYNCHRONIZER ACTIVATOR

BACKGROUND OF THE INVENTION

In the past, many different structures have been used to bring gears in a transmission up to synchronous speeds before establishing a direct driven connection between the gears. Prior art arrangements have been structurally complex, and hence are difficult to manufacture, assemble and maintain. Furthermore, known transmission synchronizing mechanisms have not been completely reliable under all conditions of service.

SUMMARY OF THE INVENTION

The synchronizing mechanism of the present invention includes a first clutch means associated with a gear that is free to rotate relative to a driven shaft. Second clutch means are associated with a coupling member, and are movable axially of the shaft into drive transmitting relationship with respect to the first clutch means to rotate the first gear at the speed of the shaft. A cam follower is biased radially outwardly of the coupling member, and an axially movable actuating member includes a cam surface that is movable into engagement with the cam follower means upon movement of the actuating member from a rest position to an intermediate position to shift the coupling member axially and engage the first and second clutch means. The actuating member is directly coupled to a gear fixed to the shaft, so that as the first and second clutch means are brought into engagement, the rotational speed of the freely mounted gear is gradually synchronized with the rotational speed of the shaft and the gear fixed thereon. Upon further movement of the actuating member from the intermediate position to an engaged position, the cam follower means is compressed inwardly of the coupling member, and the actuating member moves axially relative to the coupling member to establish a direct driven relationship between the rotating shaft and the first gear.

Because the transmission synchronizer of the present invention includes a relatively small number of parts, several of which are conventional commercially available items, the synchronizer is relatively inexpensive to manufacture, assembly and maintain. Furthermore, because of the relative structural simplicity, the transmission synchronizer of the present invention is extremely reliable in use. Thus, the major problems inherent in prior art transmission synchronizers are obviated by the present invention.

BRIEF DESCRIPTION OF THE DRAWINGS

FIG. 1 is a fragmentary sectional view through a transmission in which the synchronizer mechanism of the present invention is used, and illustrates the actuating member in a central or rest position;

FIG. 2 is a fragmentary sectional view similar to FIG. 1, and illustrates the actuating member in and intermediate or clutch engaging position;

FIG. 3 is a fragmentary sectional view similar to FIGS. 1 and 2, but illustrating the actuating member in engaged position; and FIG. 4 is a view taken generally along line 4-4 of FIG. 3, and illustrating the entire synchronizing mechanism in end elevation.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The synchronizing mechanism of the present invention is illustrated in a transmission that is indicated generally at 10 in the drawings, with the transmission 10 including a rotatable shaft 11 that is supported in suitable bearings, not shown. Shaft 11 includes a splined portion 12 and a gear 13 is fixed to rotate with shaft 11 by having radially inwardly extending teeth 14 thereon mesh with the teeth on the splined shaft portion 12. Gears 16 and 17 are provided on opposite sides of gear 13, and gears 16 and 17 are free to rotate relative to shaft 11. A synchronizing mechanism 18 is provided between gears 16 and 17 for bringing either gear 16 or 17 up to the speed of gear 13 before establishing a direct driven connection therebetween. The elements of the synchronizing mechanism for bringing gears 16 and 17 to synchronous speeds with gear 13 are identical, so that common reference numerals have been used to indicate corresponding elements for each of gears 16 and 17, with the subscript *a* having been added to the elements of the synchronizing mechanism for rotating gear 17.

Gear 16 includes an axially extending hub 20 having a plurality of radially outwardly extending gear teeth 21 thereon. A first clutch means 22 is arranged coaxially with shaft 11, and is operatively associated with gear 16 for rotation thereby. Clutch means 22 includes a plurality of annular clutch plates 23 having toothlike inner portions 24 received between the teeth 21 on gear hub 20. Annularly shaped clutch facing material 25 is provided adjacent the outer ends of disks 23 and on the outer surface of an annular boss 26 on gear 16.

A second clutch means 28 is arranged coaxially of shaft 11, and is mounted for axial movement into and out of drive transmitting relationship with respect to clutch means 22. Clutch means 28 includes a plurality of annular clutch plates 29 having outwardly facing notches 30 drivingly engaged with guide pins 31. As is evident from FIG. 4, three drive pins 31 are provided in the illustrated embodiment, although two or more guide pins may be provided, if desired. The notched portions 30 of clutch plate 29 embrace reduced diameter end portions 32 of guide pins 31, and the clutch plates 29 are retained on guide pins 31 by a suitable fastener, such as a C-ring 33 that is received in a circumferential groove at the outer end of each pin portion 32. Annular clutch facings 34 are provided on clutch plates 29 in alinement with clutch facings 25, and are movable into drive transmitting engagement therewith by a shifter mechanism 35.

Shifter mechanism 35 includes an actuating member 37 coaxial with shaft 11, and including a splined inner portion 38 that establishes a direct driving relationship with outwardly facing, longitudinally extending teeth 36 on gear 13; and the cooperative action of teeth 36 and splined portion 38 mounts actuating member 37 for movement axially relative to shaft 11. Actuating member 37 includes a central web 39 having circumferentially spaced openings 40 therein that slidable embrace the enlarged midportion 41 of guide pins 31.

Actuating member 37 further includes an outwardly extending annular flange 42 adjacent the outer end thereof, with flange 42 including spaced inner surfaces 43 and 44 that are generally concentric with shaft 11, and with an inclined or beveled cam surface 45 connecting surfaces 43 and 44. Actuating member 37 is movable between the rest position of FIG. 1, the intermediate position of FIG. 2, and the engaged position of FIG. 3 by a suitable shifter member, not shown, that may be defined by a shifter arm having its inner end received within an annular outwardly facing groove 46 in actuating member 37. A plurality of circumferentially spaced recesses 47 are provided in flange 42 for a purpose to hereafter appear.

Shifter mechanism 35 further includes an annular coupling member 50 having a plurality of circumferentially spaced openings 51 that are impaled by the reduced diameter end portions 32 of guide pins 31. Coupling member 50 includes an outwardly facing circumferentially extending recess 52 in the outer periphery thereof, and cam follower means 53 is mounted within recess 52. Cam follower means 53 includes a split ring 54 having spaced ends 55 (FIG. 4), and ring 54 is biased outwardly of recess 52 by a circumferentially extending wave spring 56 that includes a series of circumferentially spaced crests and troughs 57.

Retaining means 60 are connected between guide pins 31 and split ring 54 for retaining the ring within recess 52, and each retaining means is defined by a keeper element 61 having a curved portion 62 seated within a circumferentially extending groove in each guide pin portion 32, and a reversely bent end portion 63 overlying ring 54. Keeper elements 61 not only function to retain guide ring 54 within recess 52, but also serve to retain the coupling member 50 against the shoulder 64 on guide pin 31 at the junction between the guide pin portions 32 and 41. The recesses 47 in the flange 42 of the actuating member 37 allow the actuating member 37 to be shifted from the rest position of FIG. 1 to the engaged position of FIG. 3 without interfering with the bent end portions 63 of the deeper elements 61.

Assuming that the shaft 11 and gear 13 are rotated at a predetermined speed, and it is desired to rotate gear 16 at that speed, actuating member 37 is initially shifted to the left from the rest position of FIG. 1 to the intermediate position of FIG. 2 to move the cam surface 45 into engagement with the split ring 54. As the actuating member 37 moves into the intermediate position, the cam and cam follower means cooperate to shift the coupling member 50 axially relative to shaft 11, and to bring the clutch means 28 into engagement with the clutch means 22 to thereby gradually increase the rotational speed of gear 16 to that of shaft 11 and gear 13. When gear 16 is rotating at the speed of shaft 11 and gear 13, actuating member 37 is moved from the intermediate position of FIG. 2 to the engaged position of FIG. 3, and during this movement, cam surface 45 compresses the split ring 54 radially inwardly against the bias of wave spring 55, and actuating member 37 moves axially relative to coupling member 50 to place the spline teeth 38 on actuating member 37 in direct driving engagement with the gear teeth 21 on gear 16.

From the above, it will be apparent that if shaft 11 and gear 13 are rotating at a predetermined speed, and it is desired to rotate gear 17 at that speed, actuating member 37 is moved to the right instead of to the left, as described above. Furthermore, if gear 16 or gear 17 is rotated at a predetermined speed by gears 66 or 67, respectively, shaft 11 may be brought up to a synchronous speed by actuating the synchronizing mechanism 18 in the manner described above.

We claim:

1. In a transmission including a rotatable shaft, a first gear coaxial with said shaft and free to rotate relative thereto, and a second gear coaxial with said shaft and fixed to rotate therewith, a synchronizing mechanism for first rotating said first gear at the rotational speed of said second gear and for then establishing a direct driving connection between said gears, said mechanism comprising: first clutch means coaxial with said shaft and operatively connected with said first gear; second clutch means coaxial with said shaft and mounted for movement axially of said shaft into and out of drive transmitting relationship with said first clutch means; a shifter mechanism for moving said second clutch means, said shifter mechanism including a coupling member coaxial with said shaft and mounted for movement axially thereof, said coupling member having said second clutch means operatively connected therewith, an actuating member coaxial with said shaft, said actuating member being mounted for movement axially of said shaft and relative to said coupling member from a rest position to an engaged position, means establishing a direct driving relationship between said actuating member and said second gear in both the rest and engaged positions of the actuating member, cooperating means on said actuating member and said coupling member for first connecting said members for movement together relative to said shaft during initial movement of said actuating member from said rest position to an intermediate position between said rest position and said engaged position and for then allowing said actuating member to move relative to said coupling member and relative to said shaft during movement of said actuating member from said intermediate position to said engaged position, said cooperating means including a radially inwardly facing cam means on said actuating member and a radially outwardly facing cam follower means on said coupling member, spring means biasing said cam follower means outwardly of said coupling means into position to be engaged by said cam means, whereby when said actuating member moves from said rest position to said intermediate position, said cam means engages said cam follower means to shift said coupling member and move said second clutch means into engagement with said first clutch means so that said gears are rotated at the same speed; and cooperating means on said first gear and said actuating member for establishing a direct driving connection therebetween when said actuating member moves from said intermediate position to said engaged position.

2. The invention set forth in claim 1 in which said coupling member is an annular disk having a recess in the outer periphery thereof, said recess having said spring means and said cam follower means therein.

3. The invention set forth in claim 2 in which said spring means is defined by a generally annularly shaped spring member having alternating crests and troughs, and wherein said cam follower means is defined by a generally annularly shaped split ring embracing said spring member.

4. The invention set forth in claim 3 in which said actuating member includes a circumaxially extending flange having a beveled surface defining said cam means.

5. The invention set forth in claim 4 in which a plurality of guide pins extend outwardly from said coupling member in mutually parallel relationship with respect to said shaft, and wherein said actuating member has a plurality of openings therein, each opening slidably receiving a guide pin.

6. The invention set forth in claim 5 in which retaining means are connected between each guide pin and said split ring for keeping the split ring in said recess.

7. The invention set forth in claim 6 in which said coupling member includes a plurality of openings alined with the openings in said actuating member, said guide pins extending through said alined openings, each of said retaining means being arranged to hold said coupling member at an axially fixed position on said guide pins.

8. The invention set forth in claim 7 in which each guide pin has an end portion of reduces diameter defining an outwardly facing shoulder against which said coupling member abuts, said guide pins each further having a circumferentially extending recess outwardly of said coupling member, and wherein each retaining means is defined by a keeper member having a curved portion seated in a guide pin recess and a reversely bent end portion overlying said split ring.

9. The invention set forth in claim 8 in which the circumaxially extending flange of said actuating member includes a plurality of circumferentially spaced recesses, each alined with the reversely bent end portion of one of said keeper members, whereby said actuating member can move from said intermediate position to said engaged position without interfering with said keeper members.